United States Patent [19]

Miyahara et al.

[11] Patent Number: 5,186,954
[45] Date of Patent: Feb. 16, 1993

[54] CONTROLLER OF AN INJECTION MOLDING MACHINE

[75] Inventors: Masaaki Miyahara; Masashi Suganuma, both of Nagano, Japan

[73] Assignee: Nissei Jushi Kogyo Kabushiki Kaisha, Nagano, Japan

[21] Appl. No.: 737,484

[22] Filed: Jul. 30, 1991

[30] Foreign Application Priority Data

Aug. 4, 1990 [JP] Japan .................................. 2-207191

[51] Int. Cl.$^5$ ............................................ B29C 45/77
[52] U.S. Cl. .................................. 425/130; 264/40.7; 425/145; 425/149
[58] Field of Search ............... 425/130, 145, 149, 171; 264/40.9

[56] References Cited

U.S. PATENT DOCUMENTS

| | | | |
|---|---|---|---|
| 4,208,176 | 6/1980 | Salerno | 425/149 |
| 4,325,896 | 4/1982 | Rodgers, Jr. | 425/145 |
| 4,507,255 | 3/1985 | Shizawa | 425/145 |
| 4,855,095 | 8/1989 | Sato | 425/145 |

FOREIGN PATENT DOCUMENTS 16-16794 9/1941 Japan .
63-44047 1/1985 Japan .

*Primary Examiner*—Tim Heitbrink

[57] ABSTRACT

A controller of an injection molding apparatus has a plurality of injection apparatuses from which different molding materials are injected into a cavity of a mold to fill the cavity so that molding is performed. The controller includes a first control unit for controlling operation of a specific injection apparatus on the basis of a previously set target value, for example, in the feedback control manner, a physical amount detection unit for detecting a physical amount (screw velocity, screw position, injection pressure, temperature or the like) concerning the operation of the specific injection apparatus, and a second control unit for obtaining a linkage target value for other injection apparatus from the detected physical amount (detection value) to control operation of the other injection apparatus on the basis of the linkage target value, for example, in the feedback control manner. The second control unit includes an operation function unit for calculating the linkage target value of the other injection apparatus from the detection value. Thus, the other injection apparatus is controlled in interlocked relationship with the operation state of the specific injection apparatus and the operation timings between the specific and other injection apparatuses is synchronized.

6 Claims, 2 Drawing Sheets

CONTROLLER OF AN INJECTION MOLDING MACHINE

FIELD OF THE INVENTION

The present invention relates to a controller of an injection molding machine for performing multi-color molding by a plurality of injection apparatuses.

DESCRIPTION OF THE RELEVANT ART

Heretofore, an injection molding machine in which a plurality of materials to be molded are injected into a cavity of a single injection mold to fill the cavity so that multi-color molding is performed is known in, for example, Japanese Patent Publications Nos. 63-44047 and 41-16794.

FIG. 2 shows an example of the injection molding machine of this type. In FIG. 2, numeral 5 denotes a base. A mold clamping apparatus 6 for supporting a mold 4 is disposed at one side of the base 5 and two injection apparatuses, that is, a main injection apparatus 2 and a sub-injection apparatus 3 are disposed at the other side of the base. The injection apparatuses 2 and 3 are placed on a slide plate 7 which is slidably moved toward and away from the mold clamping apparatus 6. The apparatus 2 and 3 have ends coupled with a usual injection nozzle 8. In FIG. 2, numeral 9 denotes a driving portion for moving the slide plate 7.

For example, when a sandwich molded product A (a molded product of different materials) shown in FIG. 3 is manufactured, material Ms to be molded for a surface side is previously injected from the main injection apparatus 2 and material Mc to be molded for a core side is then injected by the sub-injection apparatus 3 while the material Ms is injected. Thus, the materials Ms and Mc are joined in the injection nozzle 8 to enter the cavity of the mold 4 from one injection inlet so that the cavity of the mold 4 is filled with the materials. In this case, the materials Ms and Mc flow in the cavity in layers through a single sprue portion and a gate portion is finally sealed by the material Ms for the surface side so that the filling is completed. The materials Ms and Mc are injected substantially simultaneously, while in the flowing process the materials Ms and Mc are separated to the outer side and the inner side, respectively.

Further, when the sandwich molded product A is manufactured, the filled state of the previously injected material Ms influences the subsequent injection and filling condition greatly. Accordingly, in order to manufacture the molded product A stably, it is necessary to properly balance the rheology characteristic of the materials Ms and Mc in the surface and core sides and to precisely control the molding condition for controlling a flowing state of the materials Ms and Mc.

Accordingly, the conventional controller of the injection molding machine of this type previously establishes process control amounts such as speed, pressure and process change-over position in the injection apparatuses exactly and effects feedback control for each of the injection apparatuses.

However, there is a problem that the relative operation timing between the injection apparatuses 2 and 3 can not be controlled exactly since the conventional controller configures an independent feedback control system for each of the injection apparatuses 2 and 3. Accordingly, for example, dispersed filled state by the sub-injection apparatus 3 occurs individually even for dispersed filled state by the preceding main injection apparatus 2. Thus, thickness of the material filled in the surface side of the sandwich molded product A is dispersed for each shot and the strength of the product which is the physical properties of the molded A is uneven. This will result in large degradation of the molding quality.

SUMMARY OF THE INVENTION

It is an object of the present invention to provide a controller of an injection molding machine capable of achieving improved uniformity and quality of a molded product by preventing dispersion of the molded state such as thickness for each shot to obtain uniform mechanical characteristics to thereby reduce cost by reducing the amount of interior products.

Further, it is another object of the present invention to provide a controller of an injection molding machine in which even if molding conditions established once are changed, it is sufficient that only molding conditions for a specific injection apparatus are changed, and reduction of labor can be attained.

In order to achieve the above objects, the controller 1 according to the present invention comprises a first control unit 11 for controlling operation of a main injection apparatus 2 in accordance with a previously set target value Xp. The controller 1 further comprises a physical amount detection unit 12 for detecting physical amounts (screw speed, screw position, injection pressure, temperature and the like) relative to the operation of the main injection apparatus 2, and a second control unit 13 for obtaining a linkage target value Xo for a sub-injection apparatus 3 from the detected physical amount (detection value Yp) to control operation of the sub-injection apparatus 3 in accordance with the linkage target value Xo in a feedback manner, for example. The second control unit 13 includes an operation function unit 14 for calculating the linkage target value Xo of the sub-injection apparatus 3 on the basis of the detection value Xp.

Thus, in the main injection apparatus 2, the physical amount detection unit 12 detects the physical amount relative to the operation of the main injection apparatus 2 to obtain the detection value Yp. The first control unit 11 compares the detection value Yp with the set target value Xp and feedback controls the operation of the main injection apparatus 2 so that the detection value Yp is equal to the set target value Xp. On the other hand, in the sub-injection apparatus 3, the detection value Yp is supplied from the main injection apparatus 2 and the linkage target value Xp for the sub-injection apparatus 3 is calculated by the operation function unit 14. The second control unit 13 compares the linkage target value Xo with the physical amount (detection value Yq) relative to the operation of the sub-injection apparatus 3 detected from the sub-injection apparatus 3 and feedback controls the operation of the sub-injection apparatus 3 so that the linkage target value Xo is equal to the detection value Yq. In this manner, the sub-injection apparatus 3 is controlled in interlocked relationship with the operation state of the main injection apparatus 2 so that the operation timing therebetween is synchronized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

A preferred embodiment of the present invention is now described in detail with reference to the accompanying drawings.

Figure 2:
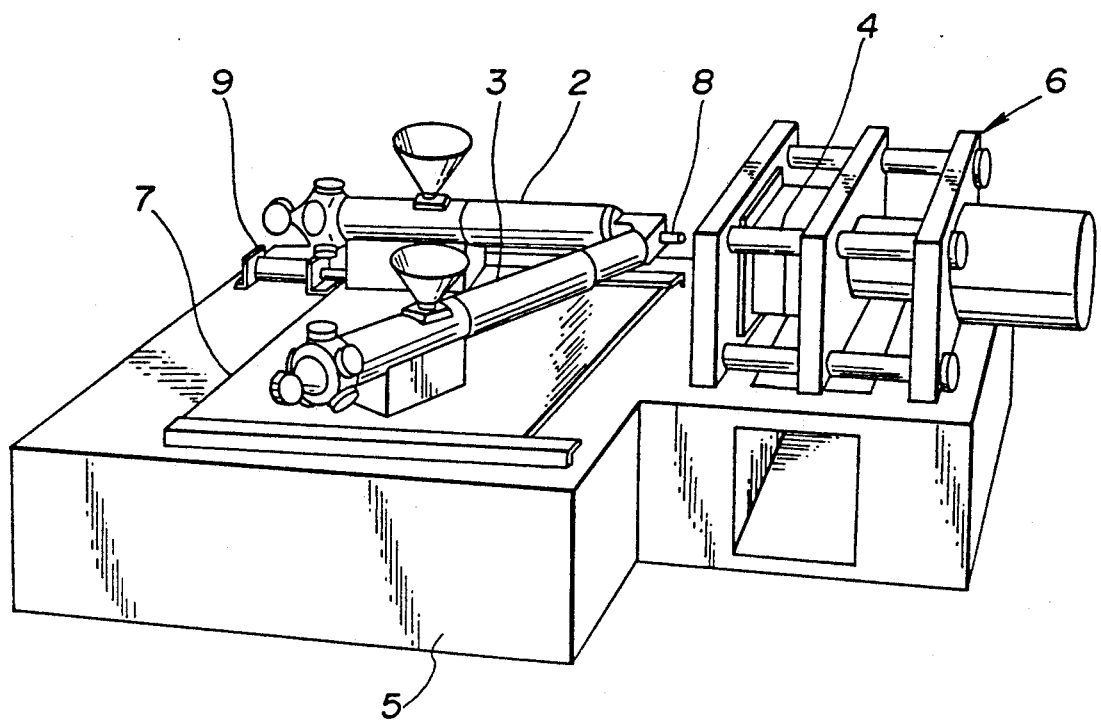
FIG. 2 is a perspective view showing an external appearance of an injection molding machine provided with a plurality of injection apparatuses.
Figure 3:
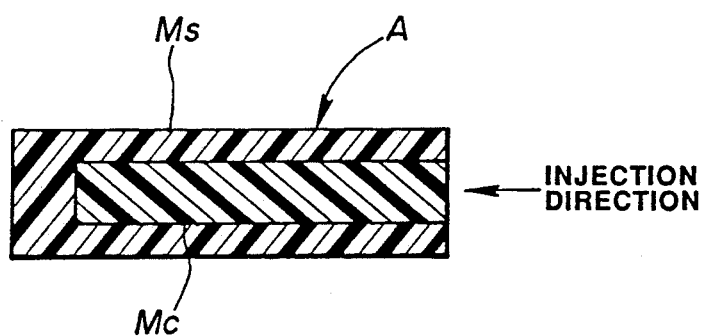
FIG. 3 is a sectional view of a sandwich molded product manufactured by the injection apparatus of FIG. 2.

The injection molding machine shown in FIG. 2 can be utilized.

Figure 1:
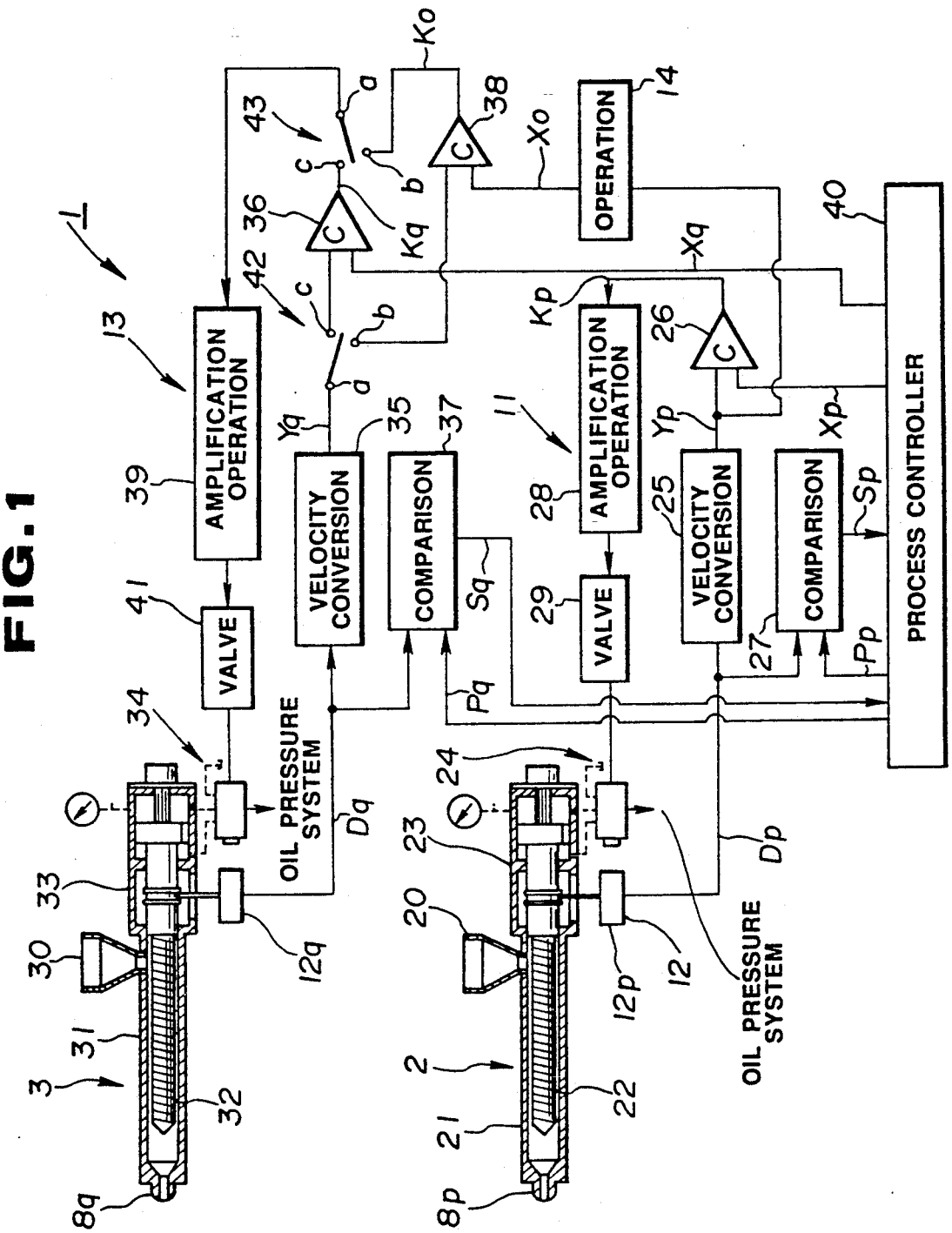
FIG. 1 is a block diagram of a controller according to the present invention.

Further, the controller 1 included in the injection molding machine is configured as shown in FIG. 1.

In FIG. 1, numeral 2 denotes a main injection apparatus constituting the specific injection apparatus, and numeral 3 denotes a sub-injection apparatus constituting the other injection apparatus. The main injection apparatus 2 comprises a heating cylinder 21 having a nozzle portion $8p$ disposed at a front end and a hopper 20 disposed at a back portion, a screw 22 inserted into the heating cylinder 21 and an injection cylinder 23 for moving the screw 22 forward and backward and connected to an oil pressure circuit 24. On the other hand, the sub-injection apparatus 3 comprises a heating cylinder 31 having a nozzle portion $8q$ disposed at a front end and a hopper 30 disposed at a back portion, a screw 32 inserted into the heating cylinder 31 and an injection cylinder 33 for moving the screw 32 forward and backward and connected to an oil pressure circuit 34. The nozzle portion $8p$ and the nozzle portion $8q$ are connected to a common injection nozzle 8.

Further, the main injection apparatus 2 comprises a physical amount detection unit 12, that is, a position sensor $12p$ for detecting a position of the screw 22 and a first control unit 11 including a velocity conversion unit 25, comparators 26 and 27, a process controller 40, an amplification operation unit 28 and a servo valve 29. On the other hand, the sub-injection apparatus 3 comprises a position sensor $12q$ for detecting a position of the screw 32 and a second control unit 13 including a velocity conversion unit 35, comparators 36 and 37, a process controller 40, an amplification operation unit 39, a servo valve 41, an operation function unit 14, and interlocked change-over switches 42 and 43. Each portions are connected as shown in the block system diagram of FIG. 1.

Operation of the control unit 1 is now described.

The control unit 1 establishes an independent control mode in which the main injection apparatus 2 and the sub-injection apparatus 3 are controlled independently when a movable contact a of the interlocked change-over switches 42 and 43 is switched to a stationary contact c. Further, when the movable contact a of the change-over switches 42 and 43 is switched to a stationary contact b, an interlock control mode is established in which the main injection apparatus 2 and the sub-injection apparatus 3 are controlled in interlocked relationship with each other.

The independent control mode is now described. In this case, in the main injection apparatus, a position of the screw 22 is detected by the position sensor $12p$ and the position information Dp is converted into velocity information (detection value Yp) by the velocity conversion unit 25. Further, the comparator 26 is supplied with the detection value Yp and the set target value Xp established previously in the process container 40 and produces a difference value Kp between the detection value Yp and the target value Xp. The difference value Kp is supplied to the servo valve 29 through the amplification operation unit 28. Thus, the injection cylinder 23 is controlled and the feedback control is made so that the velocity of the screw 22 is equal to the set target value Xp. On the other hand, the comparator 27 is supplied with the position information Dp detected by the position sensor $12p$ and a change-over position set value Pp established previously in the process controller 40 and supplies a coincidence signal Sp to the process controller 40 when the position information Dp is coincident with the change-over position set value Pp. The predetermined process change-over is made by the timing of the coincidence signal Sp.

On the other hand, in the sub-injection apparatus 3, the same control is made, and the position information Dq of the position sensor $12q$ is converted into velocity information (detecting value Yq) by means of the velocity conversion unit 35. The comparator 36 is supplied with the detection value Yq and the target value Xq established previously in the process controller 40 and produces a difference value Kq between the detection value Yq and the target value Xq. The difference value Kq is supplied to the servo valve 41 through the amplification operation unit 39. Thus, the injection cylinder 33 is controlled and the feedback control is made so that the velocity of the screw 32 is equal to the target value Xq. On the other hand, the comparator 37 is supplied with the position information Dq detected by the position sensor $12q$ and a change-over position set value Pq established previously in the process controller 40 and supplies a coincidence signal Sq to the process controller 40 when the position information Dq is coincident with the change-over position set value Pq.

The interlock control mode is now described. In this case, the same independent feedback control as in the independent control mode is made in the main injection apparatus 2.

On the other hand, the sub-injection apparatus 3 is controlled in interlocked relationship with the operation state of the main injection apparatus 2. That is, the detection value Yp produced by the velocity conversion unit 25 of the main injection apparatus 2 is supplied to the comparator 38 through the operation function unit 14. In this case, the detection value Yp is used as the target value, that is, the linkage target value Xo in the sub-injection apparatus 3. Accordingly, in order to effect matching to the sub-injection apparatus 3, the detection value Yp is converted into the linkage target value Xo by the operation function unit 14 having a fixed magnification set therein. Further, the detection value Yq detected by the position sensor $12q$ of the sub-injection apparatus 3 is supplied to the comparator 38 through the change-over switch 42. The comparator 38 compares the detection value Yq with the linkage target value Xo and produces a difference value Ko. The difference value Ko is supplied through the change-over switch 43 to the amplification operation unit 39 to be subjected to a necessary signal processing, and an output of the amplification unit 39 is supplied to the servo valve 41. Thus, the injection cylinder 33 is controlled and the feedback control is made so that the velocity of the screw 32 is coincident with the linkage target value Xo.

Accordingly, the sub-injection apparatus 3 is always feedback-controlled in interlocked relationship with the main injection apparatus 2 and even if the main injection apparatus 2 is operated unstably due to the external disturbance or the like, the sub-injection apparatus 3 is operated to follow the operation of the main injection apparatus 2. Consequently, the relative operation timings between the main injection apparatus 2 and the sub-injection apparatus 3 are coincident with each other to obtain a molded product with stable quality.

The embodiment has been described in detail, while the present invention is not limited to such embodiment. For example, the main injection apparatus is feedback-controlled in the embodiment, while it may be controlled in the open loop manner. In this case, the operation of the main injection apparatus is controlled in the open loop manner on the basis of the previously set target value, while a physical amount concerning the operation of the main injection apparatus is detected to obtain the linkage target value for the sub-injection apparatus on the basis of the detected physical value, so that the operation of the sub-injection apparatus is controlled in the open loop manner on the basis of the linkage target value. Further, the screw velocity is used as the physical amount in the embodiment, while various physical amount such as an injection pressure, a screw position, a temperature or the like can be used similarly. In addition, the injection apparatus may not only be the oil driven type shown in the embodiment but also a servo motor driven type. The controller of the present invention can be utilized in the injection process as well as any molding process such as a measuring process, a pressure holding process and the like. Other configuration, number (for example, the number of the injection apparatus), method and the like can be modified without departing from the spirit of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A controller of an injection molding machine for injecting molding material into a cavity of a mold from at least a first injection apparatus and a second injection apparatus, said controller comprising a first control unit for controlling said first injection apparatus on the basis of a set target value for said first injection apparatus, a physical amount detection unit for detecting a physical amount concerning the operation of the first injection apparatus, and a second control unit for obtaining a linkage target value from the detected physical amount, said linkage target value controlling the operation of the second injection apparatus.

2. The controller of an injection molding machine according to claim 1, wherein said second control unit includes an operation function unit for calculating the linkage target value of the second injection apparatus from the detected physical amount.

3. The controller of an injection molding machine according to claim 1, wherein said first control unit feedback-controls the operation of the first injection apparatus on the basis of the set target value.

4. The controller of an injection molding machine according to claim 1, wherein said second control unit feedback-controls the operation of the second injection apparatus on the basis of the linkage target value.

5. The controller of an injection molding machine according to claim 1, wherein said second control unit includes a change-over switch for switching the linkage target value and a set target value set for the second injection apparatus.

6. The controller of an injection molding apparatus according to claim 1, wherein said physical amount includes one of a screw velocity, a screw position, an injection pressure and a temperature.

* * * * *